United States Patent
Daecke et al.

(10) Patent No.: US 9,501,446 B2
(45) Date of Patent: Nov. 22, 2016

(54) CONTROL UNIT FOR THE EXCHANGE OF DATA WITH A PERIPHERAL UNIT, PERIPHERAL UNIT, AND METHOD FOR DATA EXCHANGE

(75) Inventors: Dirk Daecke, Stuttgart (DE); Bernhard Opitz, Leonberg (DE); Stefan Doehren, Remshalden-Grunbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/112,311

(22) Filed: May 20, 2011

(65) Prior Publication Data

US 2011/0296065 A1 Dec. 1, 2011

(30) Foreign Application Priority Data

May 27, 2010 (DE) .................. 10 2010 029 349

(51) Int. Cl.
*G06F 13/42* (2006.01)
*H04L 12/40* (2006.01)

(52) U.S. Cl.
CPC ..... *G06F 13/4291* (2013.01); *H04L 12/40084* (2013.01); *H04L 12/40123* (2013.01); *H04L 2012/40273* (2013.01)

(58) Field of Classification Search
CPC ........... G06F 13/4291; H04L 12/40084; H04L 12/40123; H04L 2012/40273
USPC ........................................................ 710/61
See application file for complete search history.

(56) References Cited

U.S. PATENT DOCUMENTS

| 5,874,812 | A  | * | 2/1999  | Chang ............................. 318/35 |
| 7,010,607 | B1 | * | 3/2006  | Bunton ......................... 709/228 |
| 7,088,735 | B1 | * | 8/2006  | Reohr et al. .................. 370/466 |
| 7,555,090 | B2 | * | 6/2009  | Simmons ............ H04L 27/0012 375/375 |
| 2002/0097182 | A1 | * | 7/2002  | Goren ..................... G01S 1/026 342/357.4 |
| 2004/0170242 | A1 | * | 9/2004  | Lautenschlager ............. 375/361 |
| 2005/0166665 | A1 | * | 8/2005  | Honda .................. F02D 35/023 73/35.12 |
| 2005/0262280 | A1 | * | 11/2005 | Cherukuri et al. ............ 710/106 |
| 2006/0045031 | A1 | * | 3/2006  | Hickey et al. ................ 370/266 |
| 2006/0047862 | A1 | * | 3/2006  | Shearer et al. ................. 710/15 |
| 2006/0078073 | A1 |   | 4/2006  | Simmons |
| 2008/0292037 | A1 | * | 11/2008 | Fujita et al. .................. 375/354 |
| 2009/0070516 | A1 |   | 3/2009  | Hou |
| 2009/0297160 | A1 | * | 12/2009 | Matsui et al. ................ 398/135 |
| 2010/0075724 | A1 | * | 3/2010  | Sivadas et al. ............... 455/571 |

(Continued)

FOREIGN PATENT DOCUMENTS

| CN | 1760849 A | 4/2006 |
| CN | 1870492 A | 11/2006 |

(Continued)

*Primary Examiner* — Henry Tsai
*Assistant Examiner* — John Roche
(74) *Attorney, Agent, or Firm* — Norton Rose Fulbright LLP (57) ABSTRACT

A control unit is described that has at least one communications interface for the exchange of data with at least one peripheral unit, the communications interface being configured for transmitting synchronization signals to the peripheral unit in a first, synchronous operating mode. The communications interface is configured to change a time interval between two successive synchronization signals.

22 Claims, 3 Drawing Sheets (56) References Cited

U.S. PATENT DOCUMENTS

2010/0085101 A1* 4/2010 Walker et al. ................ 327/306
2011/0103534 A1* 5/2011 Axmon ................ H04J 11/0069
　　　　　　　　　　　　　　　　　　　　　　375/371

FOREIGN PATENT DOCUMENTS

| CN | 101388741 A | 3/2009 |
| EP | 0938048 A1 | 8/1999 |
| KR | 20070010945 A | 1/2007 |

* cited by examiner

CONTROL UNIT FOR THE EXCHANGE OF DATA WITH A PERIPHERAL UNIT, PERIPHERAL UNIT, AND METHOD FOR DATA EXCHANGE

RELATED APPLICATION INFORMATION

The present application claims priority to and the benefit of German patent application no. 10 2010 029 349.0, which was filed in Germany on May 27, 2010, the disclosure of which is incorporated herein by reference.

FIELD OF THE INVENTION

The present invention relates to s control unit having at least one communications interface for the exchange of data with at least one peripheral unit, the communications interface being configured for transmitting synchronization signals to the peripheral unit in a first, synchronous operating mode. The present invention also relates to a peripheral unit for the exchange of data with a control unit, as well as a method for exchanging data between a control unit and a peripheral unit.

BACKGROUND INFORMATION

Control units, peripheral units and operating methods of the type named above are known from the motor vehicle field, for example, the data being exchanged between peripheral units configured as sensor modules and a control unit. A data exchange is able to take place, for instance, while using the peripheral sensor interface, PSI5 Standard, particularly according to PSI5 Version 1.3.

In the known systems, what is disadvantageous is the low flexibility of the data exchange, so that optimal communication between various components is not a given in all fields of application.

SUMMARY OF THE INVENTION

Accordingly, it is an object of the exemplary embodiments and/or exemplary methods of the present invention to improve a control unit, a peripheral unit and a method of the type named at the outset, to the extent that a greater flexibility exists in the exchange of data.

In the case of the control unit of the type named at the outset, this object is attained, according to the exemplary embodiments and/or exemplary methods of the present invention, in that the communications interface is configured to change a time interval between two successive synchronization signals. This gives rise to the advantage that the control unit is able to make a request for sensor data, for instance, which are emitted in reaction to receiving a synchronization signal from the peripheral units, in a particularly flexible manner. For instance, by lowering the time interval between successive synchronization signals, the frequency of the data packets transmitted by the peripheral units to the control unit is able to be increased. Because of that, for instance, a higher resolution in time is able to be achieved when transmitting sensor data from a peripheral unit to the control unit, and in addition, the variable may be changed.

By increasing the time interval between successive synchronization signals, it is also possible to request sensor data from a peripheral unit specifically only by the control unit or rather its communications interface, if the sensor data are actually needed in the control unit.

The change in the time interval between successive synchronization signals, according to the exemplary embodiments and/or exemplary methods of the present invention, accordingly makes possible advantageously a deviation from a rigid time pattern for transmitting data from the peripheral unit to the control unit. Because of that, an event-controlled transmission of data to the control unit is particularly also able to be implemented in that the control unit, or rather its communications interface, dynamically establishes the time interval for the synchronization signals in such a way that the synchronization signals are only output to the peripheral unit if new data are required in the control unit from the peripheral unit.

In particular, while using the principle according to the exemplary embodiments and/or exemplary methods of the present invention, it is also possible to change the time interval between successive synchronization signals during an operation of the communications interface, changes in the time interval being able to be taken up, particularly, also in multiple fashion in directly successive communication cycles. In this way, a plurality of successive data frames may be requested by one peripheral unit to the control unit, while in each case using different distances in time between the individual data frames, and transmitted.

In one specific embodiment of the control unit according to the present invention, the communications interface is configured to carry out the exchange of data with the peripheral unit, at least at times, according to the Peripheral Sensor Interface, PSI5 Standard, especially according to the PSI5 Version 1.3. Because of that, the control unit according to the exemplary embodiments and/or exemplary methods of the present invention is able to be integrated into existing sensor networks, which occur particularly in the motor vehicle field. Besides a usual, completely PSI5-conforming operating mode, a control unit according to the exemplary embodiments and/or exemplary methods of the present invention is able to undertake advantageously, in addition, the abovementioned change in the time interval between two successive synchronization signals, so as to adapt the otherwise PSI5-conforming data transmission to the requirements, for instance, of a special operating state of the control unit, with respect to the frequency of the reception of data frames in the control unit. In this respect, the principle according to the exemplary embodiments and/or exemplary methods of the present invention represents an advantageous broadening of the PSI5 Standard of version 1.3.

One additional supplementation of the PSI5 Standard comes about in a further specific embodiment, based on the exemplary embodiments and/or exemplary methods of the present invention, in that the communications interface is configured to carry out a change from the first, synchronous operating mode to a second, asynchronous operating mode during the data exchange with the peripheral unit, in that, as of a specifiable point in time, no more synchronization signals are transmitted to the peripheral unit. This means that, while deliberately violating the PSI5 Standard according to Version 1.3, starting from a synchronous operating mode, as of the specifiable point in time, no more synchronization signals are output by the control unit to the at least one peripheral unit, whereby it is advantageously signaled to the peripheral unit that a transition is desired from the synchronous operating mode up to now, to the asynchronous operating mode. As is known per se from the PSI5 Specification (cf. Chapter 2.3 of PSI5 Specification, Version 1.3), the asynchronous operating mode is characterized in that the data from a peripheral unit are not sent to the control unit in dependence on the previously received synchronization signals of the control unit, but rather as a function of at least one internal operating variable of a peripheral unit, such as signals of an internal timer of a peripheral unit.

In a further, very advantageous specific embodiment, it is provided that, in the data exchange with the peripheral unit, the communications interface is configured to carry out a change from a second, asynchronous operating mode to the first, synchronous operating mode in that, as of a specifiable point in time, synchronization signals are transmitted to the peripheral unit. Because of that, a transition may advantageously be made from the asynchronous to the synchronous operating mode, particularly without the requirement of a complete initialization of the overall system.

In another advantageous specific embodiment of the control unit according to the present invention, it is provided that the communications interface is configured to form the time interval between two successive synchronization signals as a function of: a) a timer unit integrated into the communications interface and/or b) a timer unit of the control unit and/or c) at least one operating state and/or an operating state change of the control unit.

In the case of the timer unit integrated into the communications interface, timers that are known per se may be involved, for example, like the ones provided in the usual microcontrollers or even in digital signal processors, and are generally designated as timers. In the same way, recourse may be made to a timer unit of the control unit, to form the time interval between successive synchronization signals. Quite particularly advantageously, the time interval between successive synchronization signals may be formed, alternatively or in supplementation, as a function of at least one operating state and/or an operating state change of the control unit, which, besides a pure, time-synchronous formation of the time interval, in particular also makes possible an event-controlled formation. For example, in the use of a control unit within a control device for an internal combustion engine of a motor vehicle (an engine control unit), an event-controlled setting of the time interval between successive synchronization signals may be implemented in such a way that the synchronization signals are output synchronously with a crankshaft angle of the internal combustion engine, by the control unit to the at least one peripheral unit. Because of that, a corresponding sensor value or, generally, a data frame from a respective peripheral unit is able to be requested by the control unit synchronously with the crankshaft angle.

In a further specific embodiment of the control unit according to the present invention, the control unit is configured as a microcontroller or as a digital signal processor (DSP), and the at least one communications interface is at least partially configured as an integrated peripheral component of the microcontroller and/or the digital signal processor. The functionality of the communications interface according to the present invention may be implemented especially at least partially in hardware, the corresponding hardware components being able to be integrated into the microcontroller or the digital signal processor. It is also possible to develop appropriate hardware components for the implementation of the communications interface as discrete semiconductor circuit systems, which are integrated, together with the microcontroller or the digital signal processor, in a common chip housing. The control unit and/or the communications interface may also be configured as an application-specific integrated circuit (ASIC).

As an additional attainment of the object of the exemplary embodiments and/or exemplary methods of the present invention, a peripheral unit is noted as described herein.

As an additional attainment of the object of the present invention, a method is mentioned as described herein.

Additional advantageous specific embodiments are the subject matter of the further descriptions herein.

Additional features, application options and advantages of the present invention ensue from the following description of exemplary embodiments of the present invention, which are illustrated in the figures of the drawings. All of the described or illustrated features form the subject matter of the present invention, individually or in any combination, regardless of their combination in the claims or their antecedent reference, and also regardless of their formulation or illustration in the description or in the drawings.

DETAILED DESCRIPTION

Figure 1:
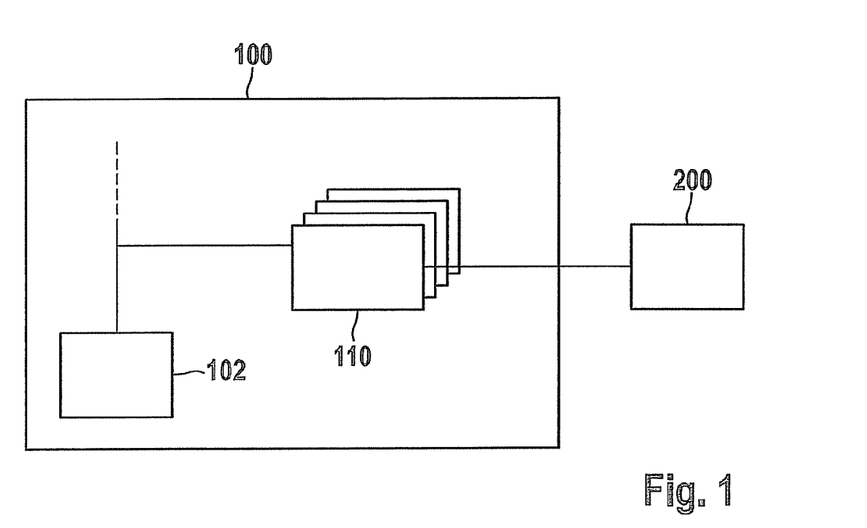
FIG. 1 schematically shows a simplified block diagram of a first specific embodiment of a control unit according to the present invention.

FIG. 1 shows schematically a block diagram of a control unit 100 according to the present invention. Control unit 100 is provided for the exchange of data with at least one peripheral unit 200, and may be used, for example, in the motor vehicle field, particularly for developing sensor networks and/or actuator networks. For example, peripheral unit 200 may be a sensor module which exchanges data with control unit 100 via a communications interface 110, that will be described in greater detail. Control unit 100 is able to evaluate these data directly, for instance, or only to process them and output them to an additional control unit (not shown).

According to one specific embodiment, control unit 100 is a control device that may be configured as a microcontroller or even as a digital signal processor (DSP), which is configured for controlling or regulating the operation of an internal combustion engine of a motor vehicle (engine control unit). Corresponding components of control unit 100 are known to one skilled in the art, and are not illustrated in the figures for the sake of clarity.

For the exchange of data between control unit 100 and peripheral unit 200, control unit 100 has available to it at least one communications interface 110. Especially when several peripheral units (not shown) are to be connected simultaneously in separate point-to-point connections to control unit 100, control unit 100 may also accordingly have several communications interfaces 110 for this purpose. At present, however, we shall describe, without restricting generality, the crucial point in the communication between peripheral unit 200 and the communications interface designated by 110 in FIG. 1.

In one particularly specific embodiment, communications interface 110 is configured to carry out the exchange of data with peripheral unit 200, at least at times, according to the Peripheral Sensor Interface, PSI5 Standard, especially according to PSI5 Version 1.3 and ff. This means that communications interface 110 according to the exemplary embodiments and/or exemplary methods of the present invention is able to be combined, for instance, with existing PSI5-conforming peripheral units. It is common to the synchronous data transmissions according to the PSI5 Standard, Version 1.3, that a data transmission from peripheral unit 200 to control unit 100 or communications interface 110 is requested in that a synchronization signal, also designated as a synchronization pulse, is output by control unit 100 to peripheral unit 200. Upon receiving such a synchronization signal, according to the PSI5 Standard, peripheral unit 200 usually sends back one or more data frames to control unit 100, compare, for example, also Chapter 2.4 of the technical specification of the PSI5 Standard, which may be retrieved from the Internet under www.psi5.org/en/pool/pdf/psi5_specification_13_080729.pdf.

In supplementation of this standard, one specific embodiment of the present invention proposes that communications interface 110 be configured to change the time interval between two successive synchronization signals. This advantageously makes it possible, on the part of control unit 100 to specify in a flexible manner, when peripheral unit 200 is to transmit data to control unit 100.

If, for instance, peripheral unit 200 is to transmit data frames to control unit 100 at a comparatively high frequency, control unit 100, by the power of communications interface 110 according to the exemplary embodiments and/or exemplary methods of the present invention, is accordingly able to reduce the time interval between two successive synchronization signals. It is understood that the minimum specifiable time interval between two successive synchronization signals has to be selected so that a corresponding data communication by peripheral unit 200 is supported. The same applies for a deviation of the time interval between two successive synchronization pulses upwards from a standard value.

While the principle according to the exemplary embodiments and/or exemplary methods of the present invention is applied, control unit 100 can thus advantageously establish the transmission frequency of data frames on the part of peripheral unit 200 to control unit 100 in such a way that, for instance, instead of the fixedly specified "Sync Signal Period" according to standard, i.e. the time interval between successive PSI5-conforming synchronization pulses, of 500 ms±1%, a time interval of only about 100 ms is used, for example. To the extent that a low frequency of data transmissions from peripheral unit 200 to control unit 100 is desired, the time interval between successive synchronization pulses may also be selected to be greater than the value that is fixedly defined in the Standard, for example, up to about 1000 ms or more.

Because of that, control unit 100 according to the present invention is able to request sensor data from peripheral unit 200 in a flexible manner, namely, exactly when these are needed in control unit 100, for instance, for further calculations.

Besides the increased flexibility, the principle according to the exemplary embodiments and/or exemplary methods of the present invention, in addition, also provides the potential for the savings of electrical energy because, at least in some operating modes of control unit 100, one may also possibly do without unnecessarily frequent data transmissions from peripheral unit 200 to control unit 100.

In addition, in such operating states of control unit 100, which require particularly high resolution in time of the sensor data supplied by peripheral unit 200, the time interval between synchronization pulses is selected to be especially short, in order, correspondingly, to transmit many data frames from peripheral unit 200 to control unit 100 per unit of time.

The principle according to the exemplary embodiments and/or exemplary methods of the present invention, explained above, may be transferred to all operating variants of synchronous data transmission, according to the PSI5 Standard as in Version 1.3 ff., as well as to all other data transmissions in which synchronization signals are used.

According to one additional specific embodiment, the change in the time interval between synchronization signals or synchronization pulses may take place dynamically, that is, during the operation of communications interface 110. This makes it conceivable to change the time interval between the pulses from one synchronization pulse to the next synchronization pulse, so that, under certain circumstances, no fixed time pattern at all exists any more between successive synchronization pulses. This caters to the circumstance that, on the part of control unit 100, especially in the case of its development as a control device for an internal combustion engine, a recording of data of peripheral unit 200 is desired that is synchronous with the crankshaft angle. In this case, the synchronization pulses are able to be output to peripheral unit 200 by control unit 100, or rather its communications interface 110, in an event-dependent manner, namely, for example, as a function of crankshaft angle data ascertained in another manner by control unit 100, in order, for example, after a specifiable change in the crankshaft angle, to request associated sensor data of peripheral unit 200.

According to one specific embodiment, control unit 100 is configured as a microcontroller or as a digital signal processor, and the at least one communications interface 110 is at least partially configured as an integrated peripheral component of the microcontroller and/or the digital signal processor. In this instance, the functionality of communications interface 110 is able to be implemented both entirely in hardware and entirely in software, or in any desired combination thereof.

According to one additional specific embodiment, communications interface 110 may use a timer unit 102 (FIG. 1) of control unit 100, for instance, a "general purpose timer", in order to ascertain or form the time interval between successive synchronization signals. For example, communications interface 110 is able to derive the time interval between synchronization signals directly from a counter value of timer unit 102 of control unit 100. This being the case, communications interface 110 does not require its own timer unit.

Figure 2:
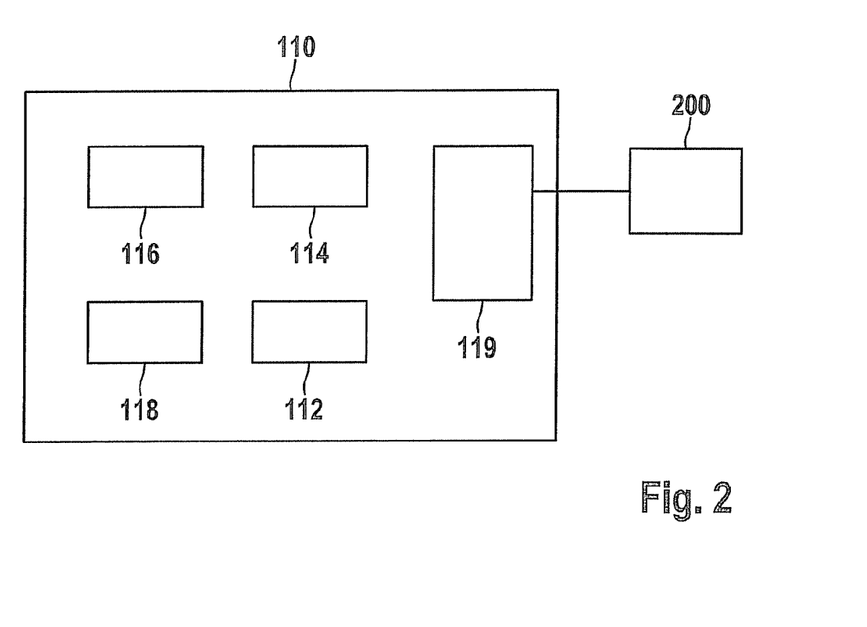
FIG. 2 schematically shows a simplified block diagram of a specific embodiment of a communications interface according to the present invention.

FIG. 2 shows a simplified block diagram of a specific embodiment of a communications interface 110 according to the present invention. In this specific embodiment, communications interface 110 has its own integrated timer unit 112, which may be drawn upon alternatively or in supplementation to timer unit 102 of control unit 100 (FIG. 1) to form the time interval of the synchronization pulse. As was described above, alternatively or in supplementation, an operating state or an operating state transition of control unit 100 may be used, in order to establish the time interval between successive synchronization pulses through communications interface 110. Because of that, it is possible, for instance, to establish the time interval between synchronization pulses as a function of interrupt events of control unit 100 or other operating variables of control unit 100.

In one specific embodiment, communications interface 110 has a decoder unit 114, which is configured to decode data signals received from peripheral unit 200. When control unit 100, according to the exemplary embodiments and/or exemplary methods of the present invention, is used for PSI5-conforming data communications, usually a Manchester coding by peripheral unit 200 will follow, which means that the sensor data or other data supplied by peripheral unit 200 to control unit 100 have Manchester coding. Therefore, the presence of a corresponding decoder unit 114 in communications interface 110 is particularly advantageous, so as to make possible an efficient decoding of the signals received in control unit 100. An especially rapid decoding is given by the implementation of decoder unit 114 in hardware.

According to an additional advantageous specific embodiment, communications interface 110 has a memory unit 116, which is configured to store data signals and/or decoded received data, as supplied by decoder unit 114, received from peripheral unit 200. Memory unit 116 may be a so-called special function register, for example, that is, a type of register storage which has particularly short access times. Other specific embodiments of memory unit 116 are also conceivable. In particular, memory unit 116 may also be a memory region of the control unit or microcontroller 100 which is made available to communications interface 110 exclusively or also for access by each of microcontroller 100 and communications interface 110.

For this purpose, it is advantageous if memory unit 116 or communications interface 110 has a data connection to present data, or has other bus systems of control unit 100, compare, among other things, the connection of timer unit 102 to communications interface 110 according to FIG. 1, via the bus structure indicated there, but not designated. This has the advantage that the data are able to be picked up there directly via DMA via the bus, and thus intermediate storage of the data in the RAM and data preparation are not required.

According to an additional advantageous specific embodiment, communications interface 110 has a time stamp unit 118, which is configured to provide data signals received from peripheral unit 200 and/or decoded received data, as supplied by decoder unit 114, with a time stamp. By time stamp one should understand a time reference, in this instance, which has a known reference to a time reference, for instance, a central counter 102 of control unit 100. It is thereby advantageously possible to retain the input and the receiving time of appropriate data of peripheral unit 200 in control unit 100, which substantially increases the precision in the evaluation of the received data. Time stamp unit 118 may advantageously be implemented either as hardware or as software, or as a combination of these.

In one further advantageous specific embodiment of the present invention, communications interface 110 has a transceiver unit 119, which is configured to convert a current interface provided for the data exchange with peripheral unit 200 to a voltage interface, which makes possible a simple connection to microcontroller/DSP 100. In this respect, the functionality of transceiver unit 119 from FIG. 2 corresponds to that of the receiver ASIC according to Chapter 2.1 of PSI5 Specification 1.3.

Transceiver unit 119 may advantageously also be provided as a separate, application-specific integrated circuit (ASIC), whereas the additional components 112, 114, 116, 118 may be integrated into communications interface 110, and thus at least partially also into microcontroller 100.

Besides a data connection, known per se, between transceiver unit 119 and the additional components of communications interface 110, providing a separate interface, for instance, an SPI (Serial Peripheral Interface) interface is also possible, for instance, in order to make possible a diagnosis or other communication between transceiver-ASIC 119 and communications interface 110, or generally, microcontroller 100.

Figure 3:
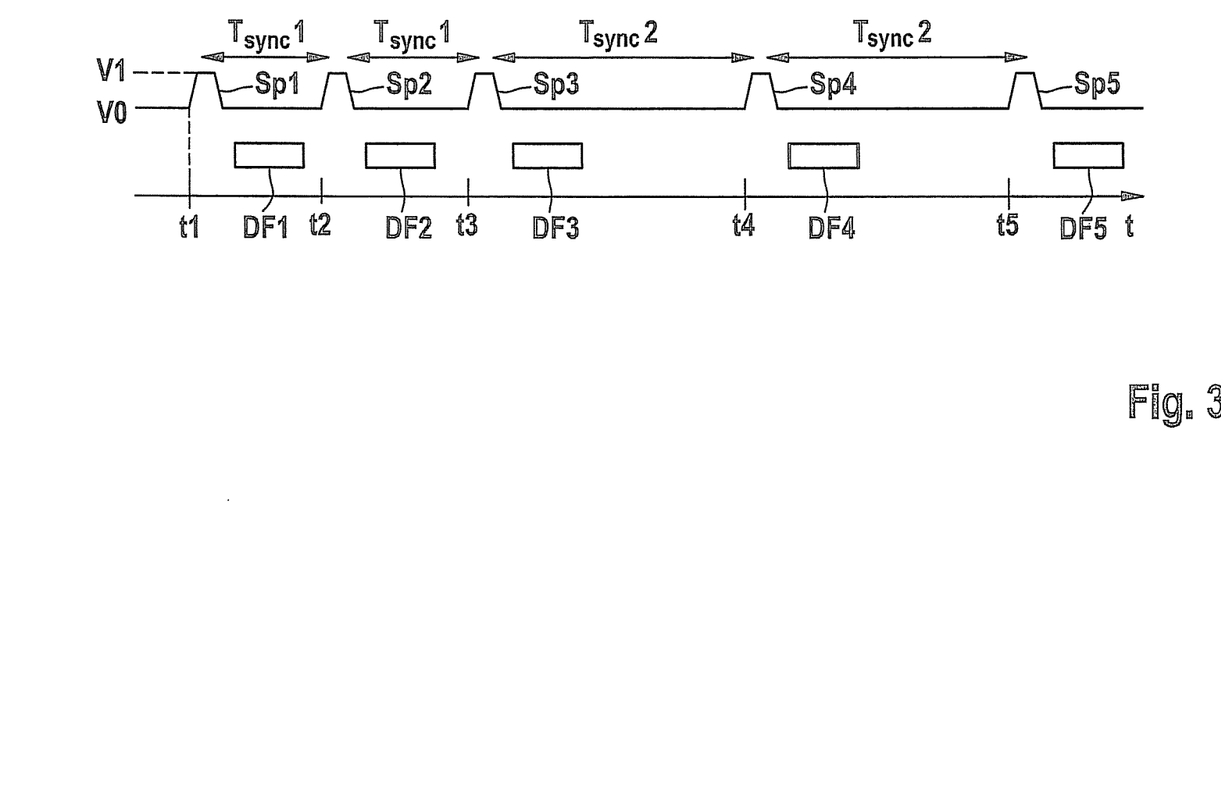
FIG. 3 shows a curve over time of various operating variables according to a specific embodiment of the method according to the present invention.

FIG. 3 shows a curve over time of operating variables of control unit 100 and peripheral unit 200. Plotted over a time axis t there is, on the one hand, a voltage signal having synchronization pulses Sp1, Sp2, Sp3, Sp4, Sp5, which is changed from a rest state level V0, in a defined manner, to a higher level V1 and back again, in order to form synchronization pulses Sp1, Sp2, Sp3, Sp4, Sp5. For the details of the pulse shape, we refer to the PSI 5 Specification.

It may be seen in FIG. 3 that, at a time t1 a first synchronization pulse Sp1 is sent out by control unit 100 to peripheral unit 200 (FIG. 1). After receiving this first synchronization pulse Sp1, peripheral unit 200, in a manner that is standard-conforming per se, outputs a first data frame DF1 to control unit 100, which is received by communications interface 110. In detail, the reception includes the conversion, of data frame DF1 that is present as a current signal, by transceiver—ASIC 119 (FIG. 2) into a voltage signal, a subsequent decoding of the Manchester-coded data using component 114, etc.

In the same way, at time t2, control unit 100 outputs a second synchronization pulse Sp2 to peripheral unit 200, whereafter again a second data frame DF2 is received in control unit 100. As may be seen in FIG. 3, time interval Tsync1 between the synchronization pulses Sp1, Sp2, Sp3 is constant in each case. That being the case, there is no deviation from the PSI5 Standard according to Version 1.3. However, since control unit 100 would like to receive the data of peripheral unit 200 at a lower frequency beginning at time t3, for instance, because the evaluation of the data in control unit 100 from now on is to take place at a lower time resolution, control unit 100, only after the elapsing of a longer time duration Tsync2>Tsync1, sends a fourth synchronization pulse Sp4 to peripheral unit 200 at time t4.

Accordingly, peripheral unit 200 sends the fourth data frame DF4 to control unit 100, also only at a later time t>t4. The same applies for an additional synchronization pulse Sp5 (time t5) and an associated data frame DF5. The change in the time interval between synchronization pulses Sp2, Sp3 and Sp3, Sp4 from a first value Tsync1 to a second value Tsync2, as such, no longer corresponds to the PSI5 Standard, and thus represents a supplementation according to the exemplary embodiments and/or exemplary methods of the present invention of the PSI5 Standard, which advantageously makes possible control of the frequency of the input of data frames DF1, DF2, DF3, . . . on the part of control unit 100 and communications interface 110.

A reduction in the time interval between the individual synchronization pulses may also be provided according to the exemplary embodiments and/or exemplary methods of the present invention, but is not shown in FIG. 3. It is also possible that, for successive synchronization pulses, distances in time that are each different from one another may be established. An event-controlled formation of distances in time Tsync1, Tsync2 is also possible.

In a further advantageous specific embodiment of control unit 100 according to the present invention, it is provided that communications interface 110 be configured to carry out, during the data exchange with peripheral unit 200, a change of the first synchronous operating mode to a second asynchronous operating mode. This is managed, according to the exemplary embodiments and/or exemplary methods of the present invention, in that, as of a specifiable time, no more synchronization signals are transmitted to peripheral unit 200.

Figure 4:
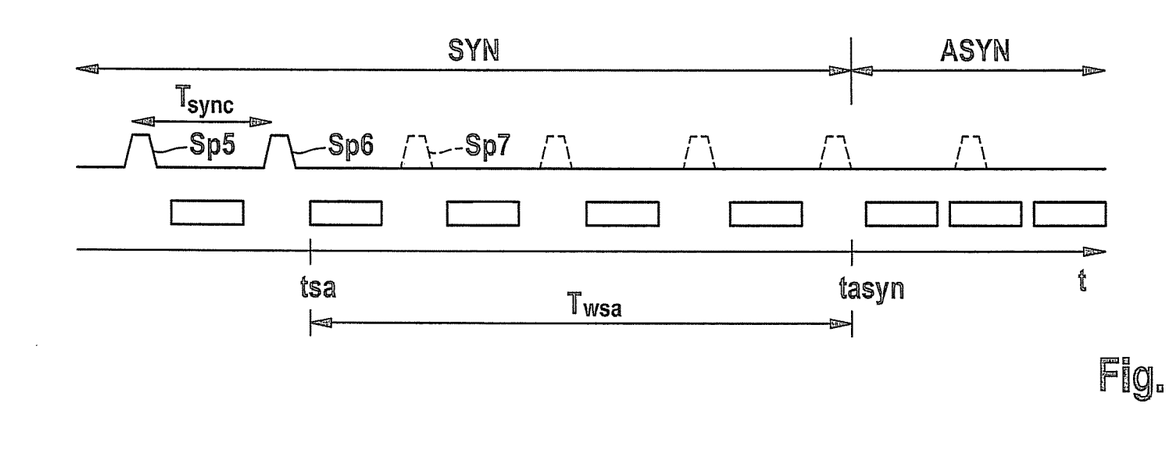
FIG. 4 shows a curve over time of various operating variables according to an additional specific embodiment of the method according to the present invention.

On this subject, FIG. 4 shows a curve over time of various operating variables of control unit 100 and peripheral unit 200. First of all, overall system 100, 200 is in the first, synchronous operating mode, cf. the characterization of the corresponding time period by a double arrow SYN. As may be seen in FIG. 4, in a manner that conforms to the PSI5 Standard per se, synchronization pulses Sp5, Sp6, having a constant time interval Tsync, are output by control unit 100 or its communications interface 110 to peripheral unit 200, data frames corresponding in the backward direction and not designated in FIG. 4 being received in control unit 100.

At time tsa, control unit 100, in deviation from the PSI5 Standard, provides a change from synchronous operating mode SYN of up to now, to an asynchronous operating mode ASYN. Accordingly, control unit 100 prevents the sending of further synchronization pulses to peripheral unit 200. For example, the actually following, next synchronization pulse Sp7 is already not sent to peripheral unit 200 any more. Therefore, synchronization pulse Sp7 in FIG. 4 is only shown by a dotted line, and not a solid one. As may be seen in FIG. 4, during a waiting time Twsa, peripheral unit 200 first sends additional data frames to control unit 100. Only after waiting time Twsa expires does peripheral unit 200 recognize that absence of the synchronization pulses involves a deliberate switching over by control unit 100 from the synchronous to the asynchronous operating mode, and therefore, as of time tasyn, it no longer waits for synchronization pulses from control unit 100. Rather, as of time tasyn, peripheral unit 200 begins the periodic sending of data frames on which PSI5-conforming asynchronous operation is based.

The switching over from the synchronous operating state SYN to the asynchronous operating state ASYN, described above with reference to FIG. 4, represents an advantageous broadening, according to the present invention, of the current PSI5 Standard, because the flexible adaptation of a data exchange is able to be implemented without a renewed initialization of communications system 100, 200. The transition from the synchronous to the asynchronous operating mode, described above, may also be combined with the change in the time interval Tsync between successive synchronization pulses, described with reference to FIG. 3. This means that synchronization pulses Sp5, Sp5 (FIG. 4) as well as additional preceding synchronization pulses do not necessarily have to be formed in a PSI5 Standard-conforming manner, but may, for instance, also have different distances in time, before, by the deliberate cessation of the further sending of synchronization pulses Sp7, a transition is made into asynchronous operating State ASYN.

Figure 5:
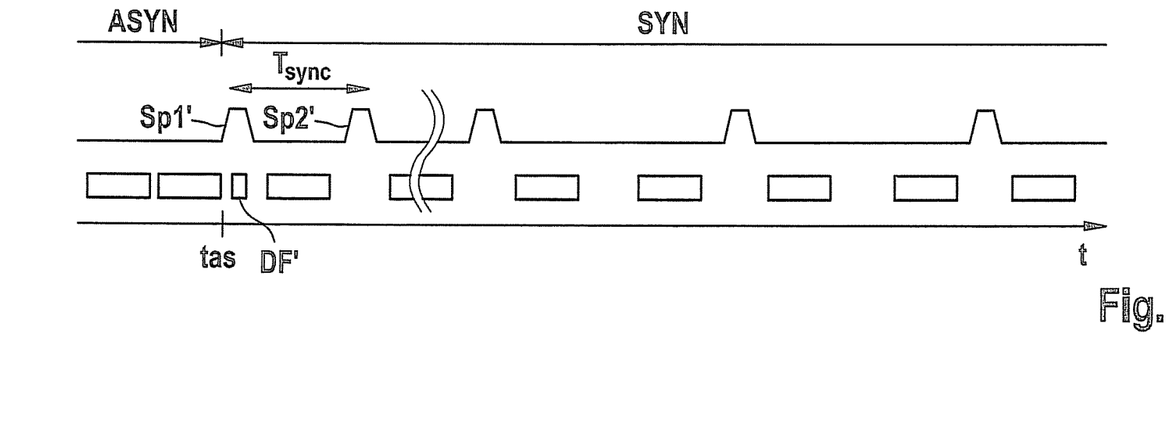
FIG. 5 shows a curve over time of various operating variables according to an additional specific embodiment of the method according to the present invention.

FIG. 5 shows a curve over time of operating variables of communications system 100, 200, as it comes about in response to the transition from an asynchronous operation ASYN to a synchronous operation SYN. First, up to a time tas, an asynchronous operation ASYN is performed, which corresponds to the usual PSI5 Standard. This means that peripheral unit 200, without request on the part of control unit 100 by corresponding synchronization pulses in FIG. 5 sends data frames, not designated in greater detail, to control unit 100.

As of time tas, control unit 100 signals to peripheral unit 200, by outputting a first (and thus not PSI5 Standard-conforming) synchronization pulse Sp1', that a transition is desired from asynchronous mode ASYN to synchronous mode SYN. It may perfectly well happen, in this context, that by sending out synchronization pulse Sp1', which does not conform to the usual PSI5 Standard, a collision takes place between synchronization pulse Sp1' and a data frame DF', that was sent out by peripheral unit 200, while observing the usual PSI5 Standard for asynchronous data transmission. By evaluating or detecting the collision of data frame DF' with synchronization pulse Sp1', peripheral unit 200 is able to conclude that from now on a synchronous operating mode SYN is desired by control unit 100, and may wait, for example, for the appearance of a second synchronization pulse Sp2', without itself outputting a further data frame, as would correspond to the asynchronous operating mode up to now. As soon as peripheral unit 200 receives second synchronization pulse Sp2' from control unit 100, this represents the confirmation for the transition into synchronous operating mode SYN, which is then continued in a manner which agrees, as such, with the usual PSI5 Standard.

The procedure described above with reference to FIG. 5 advantageously enables the transition from asynchronous operating mode ASYN to synchronous operating mode SYN by the stipulation of control unit 100. In synchronous operating mode SYN, in turn, the free specifiability exists of the distances in time Tsync between the individual synchronization pulses.

The specific embodiments of the present invention described above make possible a cost-effective and functional broadening of the existing PSI5 Standard. The following variants, in particular, are conceivable:

An automatic production of synchronization signals or synchronization pulses, by "automatic" it being understood that there is a fixed connection of time interval Tsync between the synchronization pulses to a timer unit 102 of control unit 100 and/or communications interface 110. The connection may even be possible via a plurality of interfaces 110. Consequently, referred via a plurality of interfaces 110, always only one synchronous pulse at a time is dispatched, having an adjustable time interval from the next sync-pulse. Furthermore, time interval Tsync between individual synchronization pulses may also take place as a function of at least one operating state and/or an operating state change of control unit 100 and/or communications interface 110. Because of that, in particular, an event-controlled transmission, synchronous with a crankshaft angle, for instance, of data from peripheral unit 200 to control unit 100 may be effected, which is advantageous when it comes to the development of control unit 100 as a computing unit of an engine control.

Possibly required check sum calculations or even a Manchester decoding may take place over communications interface 110, the respective functionality, cf. module 114 in FIG. 2, being implemented either in hardware or in software, or in a combination of hardware and software.

Because of the possibility of varying the distances in time Tsync between successive synchronization pulses, a mean value generation of sensor data in peripheral units 200, and thus the time resolution may advantageously also be changed. There exist peripheral units 200, for instance, which have an integrated sensor system that records sensor data using a fixedly specified scanning rate (derived from an internal reference clock pulse, for example). Depending on the distances in time of synchronization pulses, which are received by peripheral unit 200 from control unit 100, a mean value generation of the sensor data takes place over an appropriate number of scanning values, the corresponding mean values being transmitted in the data frames, that have already been described several times, by peripheral unit 200 to control unit 100. While specifying the distances in time Tsync of the synchronization pulses, an effect on the mean value formation may thus also be had on the part of control unit 100, corresponding to configured peripheral units 200.

Furthermore, the provision of different timer units 102, 112 and other sources, which make possible the timing and the production of the synchronization pulses, enables an increase in the flexibility of the PSI5 data transmission between units 100, 200.

Besides a pure PSI5-conforming data communication, in order to be able also to implement the additions to the data exchange (particularly the change from synchronous operation to asynchronous operation and vice versa), peripheral unit 200 should be configured correspondingly, that is, adapted to the special design of control unit 100 or its communications interface 110.

The principle according to the exemplary embodiments and/or exemplary methods of the present invention enables a particularly advantageous adaptation of existing PSI5 systems to the requirements that exist, for example, in engine controls for internal combustion engines or chassis systems (such as ESP, . . . ). In this instance, one may implement an optimization of the usual PSI5-conforming communications with respect to latency times, latency time jitter, synchronous pulse generation and synchronous pulse sources.

The functionality of communications interface 110, according to the exemplary embodiments and/or exemplary methods of the present invention, is at least partially integrated as an internal peripheral component, or in a comparable form, into existing microcontrollers or other computing units. In this case, a corresponding microcontroller may also have a plurality of integrated communications interfaces 110. In addition, it is also conceivable to provide the functionality of communications interface 110 according to the present invention in a separate control component, for instance, an ASIC, or to combine it with that of transceiver ASIC 119 (FIG. 2).

What is claimed is:

1. A system comprising:
    a plurality of peripheral units; and
    a control unit that includes at least one communications interface by which the control unit is configured to communicate with the plurality of peripheral units, wherein:
        the at least one communications interface is configured for transmitting synchronization signals to the plurality of peripheral units in a first, synchronous operating mode;
        the peripheral units are each assigned different respective time offsets, from respective times of the synchronization signals, at which the respective peripheral units are each respectively able to transmit sensor data regarding a respective sensed parameter to the control unit; and
        the at least one communications interface is configured for the transmission of the synchronization signals to be performed such that, for a plurality of pairs of successive ones of the synchronization signals, respective time intervals between the respective successive synchronization signals of the pairs differ from each other.

2. The system of claim 1, wherein the time intervals change during an operation of the at least one communications interface.

3. The system of claim 1, wherein the at least one communications interface is configured to carry out a change from the first, synchronous operating mode to a second, asynchronous operating mode during a data exchange with the peripheral units, by transmitting no further synchronization signals to the peripheral units as of a specifiable time.

4. The system of claim 1, wherein the at least one communications interface is configured to carry out a change from a second, asynchronous operating mode to the first, synchronous operating mode during a data exchange with the peripheral units, by transmitting synchronization signals to the peripheral units as of a specifiable time.

5. The system of claim 1, wherein the at least one communications interface is configured to form the respective time intervals as a function of at least one of: a) a timer unit integrated into the communications interface; b) a timer unit of the control unit; and c) at least one of one operating state and an operating state change of the control unit.

6. The system of claim 1, wherein the at least one communications interface has a decoder unit, which is configured to decode data signals received from the peripheral units.

7. The system of claim 1, wherein the at least one communications interface has a memory unit, which is configured to store at least one of data signals received and decoded data received from the peripheral units.

8. The system of claim 1, wherein the at least one communications interface has a time stamp unit, which is configured to provide at least one of data signals received and decoded data received from the peripheral unit with a time stamp.

9. The system of claim 1, wherein the at least one communications interface has a transceiver unit, which is configured to convert a current interface provided for the exchange of data with the peripheral units to a voltage level interface.

10. The system of claim 1, wherein the control unit includes a microcontroller or a digital signal processor, and wherein the at least one communications interface is configured at least partially as an integrated peripheral component of at least one of the microcontroller and the digital signal processor.

11. The system of claim 1, wherein the at least one communications interface is configured to carry out the exchange of data with the peripheral units, at least at times, according to the Peripheral Sensor Interface, PSI5 Standard, which is PSI5 Version 1.3.

12. A peripheral unit for the exchange of data with a control unit, comprising:
    an interface by which the peripheral unit is configured to be communicatively coupled to a control unit; and
    a peripheral unit arrangement configured to change from a synchronous operating mode to an asynchronous operating mode, wherein:
        in the synchronous operating mode:
            for each of a plurality of synchronization signals received from the control unit at a time of the receipt of which the peripheral unit has sensor data regarding a sensed parameter, the peripheral unit is configured to transmit the sensor data to the control unit after waiting a pre-assigned offset of time from the respective times of the receipt of the synchronization signals; and
            for each of the sensor data obtained by the peripheral unit during the synchronous operating mode, the peripheral unit is configured not to transmit the sensor data to the control unit until (i) after a subsequent one of the synchronization signals is received by the peripheral unit or (ii) the change to the asynchronous operating mode;

in the asynchronous operating mode, the peripheral unit is configured to transmit the sensor data to the control unit without waiting for any of the synchronization signals;

the change from the synchronous operating mode to the asynchronous operating mode occurs in response to lapse of a predefined time period from a last synchronization signal received by the peripheral unit from the control unit; and the peripheral unit is configured for the plurality of synchronization signals, to which the peripheral unit is configured to respond in the synchronous operating mode by transmission of the sensor data, to be transmitted at varying time intervals, wherein, for a plurality of pairs of successive ones of the synchronization signals, respective ones of the time intervals between the respective successive synchronization signals of the pairs differ from each other.

13. The peripheral unit of claim 12, wherein the peripheral unit arrangement is configured to change from the asynchronous operating mode to the synchronous operating mode as soon as a synchronization signal, which is transmitted by the control unit, is received.

14. The peripheral unit of claim 12, wherein the peripheral unit arrangement is configured to carry out the exchange of data with the control unit, at least at times, according to the Peripheral Sensor Interface, PSI5 Standard, which is PSI5 Version 1.3.

15. A method for the exchange of data between a control unit and at least one peripheral unit, the method comprising:
transmitting, by a control unit, via at least one communications interface, and to a plurality of peripheral units, synchronization signals in a first, synchronous operating mode; and transmitting, by the peripheral units, to the control unit, and in response to the synchronization signals, respective sensor data regarding respective sensed parameters, wherein:
the peripheral units are each assigned different respective time offsets, from respective times of the synchronization signals, at which the respective peripheral units are each respectively able to transmit to the control unit the respective sensor data; and the transmission of the synchronization signals is performed such that, for a plurality of pairs of successive ones of the synchronization signals, respective time intervals between the respective successive synchronization signals of the pairs differ from each other.

16. The method of claim 15, wherein a change from the first, synchronous operating mode to a second, asynchronous operating mode is carried out during a data exchange with the peripheral units, by transmitting no further synchronization signals to the peripheral units as of a specifiable time.

17. The method of claim 15, wherein the communications interface carries out a change from a second, asynchronous operating mode to the first, synchronous operating mode, during a data exchange with the peripheral unit, by transmitting synchronization signals to the peripheral units as of a specifiable time.

18. The method of claim 15, wherein the communications interface forms the time interval between two successive synchronization signals as a function of at least one of: a) a timer unit integrated into the communications interface; b) a timer unit of the control unit; and c) at least one of an operating state and an operating state change of the control unit.

19. The method of claim 15, wherein the communications interface provides at least one of data signals and decoded data received from the peripheral units with a time stamp using a time stamp unit.

20. The method of claim 15, wherein an exchange of data with the peripheral units is carried out, at least at times, according to the Peripheral Sensor Interface, PSI5 Standard, which is PSI5 Version 1.3.

21. The system of claim 1, wherein the peripheral units are configured to:
change from the first, synchronous operating mode to a second, asynchronous operating mode after lapse of a predefined period of time without receipt from the control unit of any of the synchronization signals;

for each of the sensor data obtained by the peripheral units during the first, synchronous operating mode, not transmit the sensor data to the control unit until (i) after a subsequent one of the synchronization signals is received from the control unit or (ii) the change to the second, asynchronous operating mode; and in the second, asynchronous operating mode, transmit the sensor data to the control unit without waiting for any of the synchronization signals.

22. The system of claim 1, wherein the control unit is configured such that a timing at which the synchronization signals are output depends on a crankshaft angle of an internal combustion engine.

* * * * *